United States Patent
Tokutomi

[11] 3,995,286
[45] Nov. 30, 1976

[54] ELECTRONIC STROBE WITH OPTIONALLY-OPERABLE CONTROLS

[75] Inventor: Seijiro Tokutomi, Kawagoe, Japan

[73] Assignee: Asahi Kogaku Kogyo Kabushiki Kaisha, Tokyo, Japan

[22] Filed: Sept. 24, 1975

[21] Appl. No.: 616,204

[30] Foreign Application Priority Data

Sept. 30, 1974 Japan .................. 49-118009[U]

[52] U.S. Cl. .................................... 354/33; 354/145
[51] Int. Cl.² .................... G03B 7/16; G03B 15/05
[58] Field of Search .............. 354/32, 33, 34, 35, 354/126, 129, 134, 139, 145, 149

[56] References Cited
UNITED STATES PATENTS

| | | |
|---|---|---|
| 3,614,918 | 10/1971 | Hennig et al. .................. 354/33 X |
| 3,631,779 | 1/1972 | Hori et al. ..................... 354/145 X |
| 3,688,659 | 9/1972 | Takishima et al. ............. 354/145 X |
| 3,710,701 | 1/1973 | Takishima et al. ............. 354/145 X |
| 3,723,810 | 3/1973 | Mashimo ........................ 354/145 X |
| 3,779,141 | 12/1973 | Ueda et al. ...................... 354/33 |

Primary Examiner—Joseph F. Peters, Jr.
Attorney, Agent, or Firm—Steinberg and Blake

[57] ABSTRACT

An electronic strobe adapted to be used with a camera for providing flash illumination. The electronic strobe has its own circuitry for automatically determining the extent of flash exposure with a part of this circuitry being adjustable for introducing a variable exposure-determining factor such as film speed and diaphragm aperture. When the electronic strobe is used with a camera which does not have its own electronic shutter-controlling circuitry, then the controls of the strobe are used for introducing a variable factor of the latter type. However, when the electronic strobe is used with a camera which does have its own electronic circuitry for automatically determining the exposure time, then that part of the latter circuitry of the camera which introduces a variable factor of the above type is electrically connectable with the circuitry of the strobe to control the latter according to such a variable from the circuitry of the camera rather than from the circuitry of the strobe itself.

10 Claims, 11 Drawing Figures

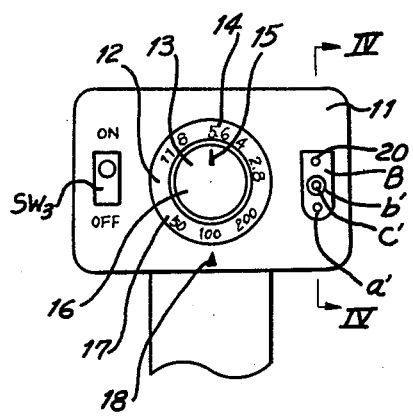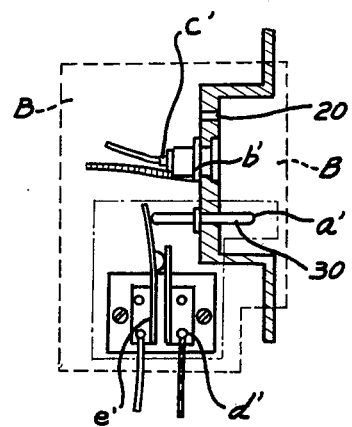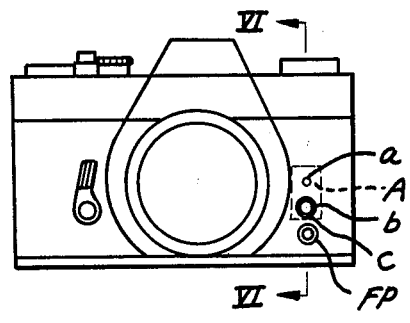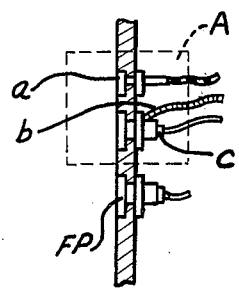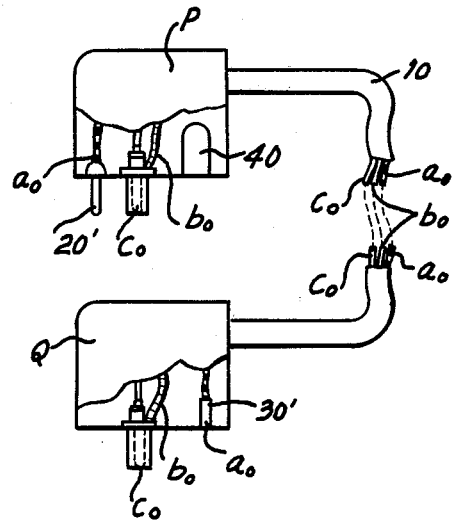

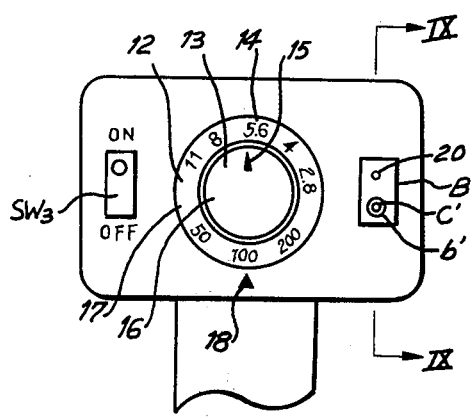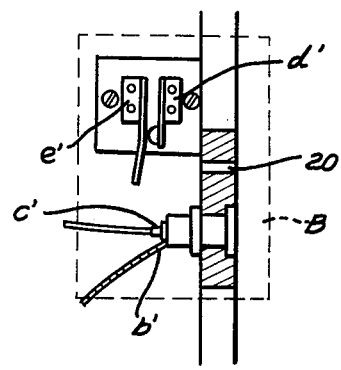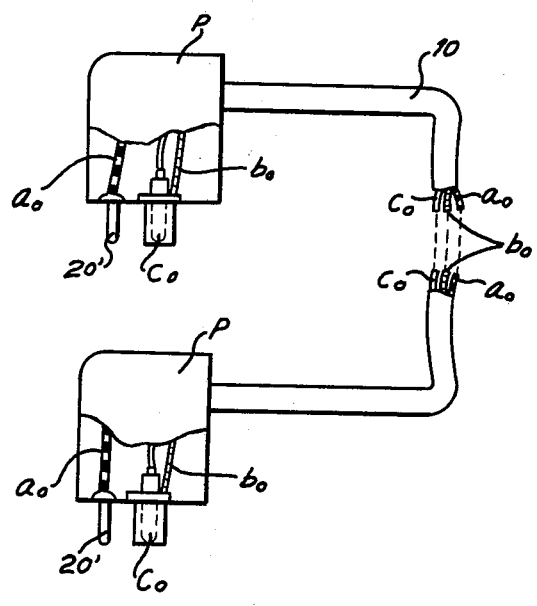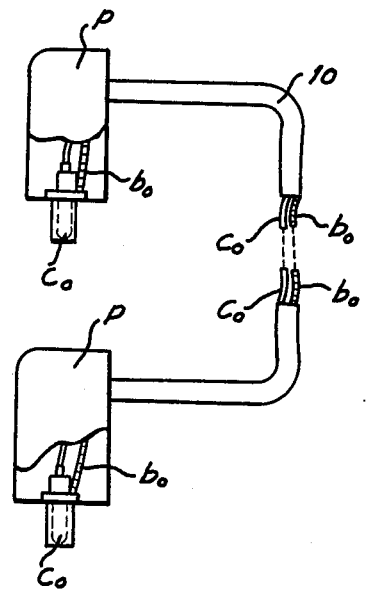

ELECTRONIC STROBE WITH OPTIONALLY-OPERABLE CONTROLS

BACKGROUND OF THE INVENTION

The present invention relates to photography.

In particular, the present invention relates to electronic strobes adapted to be used with cameras for the purposes of achieving exposures with flash illumination.

Automatic adjustable electronic strobes are known. For providing an adjustable amount of flash illumination such strobes have the extent of flash illumination provided thereby regulated in accordance with a plurality of factors one of which is the sensitivity or speed of the film which is to be exposed while another is the amount of light reflected back from the object which is to be photographed. In general, the control of the amount of light provided by the strobe in accordance with the film speed setting will in turn determine the required setting of the diaphragm aperture for achieving a proper exposure. It is, however, also possible to vary the amount of light emitted by the electronic strobe and to provide a selected diaphragm aperture in accordance with the variation of the light emitted by the electronic strobe.

Thus, electronic strobes which are capable of automatically terminating the flash illumination when providing the amount of light required for a proper exposure have their own adjusting structures capable of presetting the circuitry of the automatic electronic strobe in order to take into consideration such factors as film speed and diaphragm aperture. However, there is an inconvenience involved with such strobes in that the operator must remember to set the diaphragm of the camera at the particular setting called for by the adjustment of the automatic electronic strobe. Sometime the camera operator forgets to adjust the diaphragm setting of the camera to a value required for operation with the electronic strobe, and under these conditions improper exposure will result unless the camera happens by pure chance to have the proper diaphragm setting for use with the particular electronic strobe. Moreover, at the present time there are many different types of cameras available for photographic purposes. Some of these cameras have their own electronic circuitry for automatically determining the extent to which film in the camera is exposed while other cameras do not have such electronic circuitry and instead must be manually set in order to provide control of the extent of film exposure. However, when utilizing either of these different types of cameras it is necessary with present-day electronic strobes to provide for the factors such as film speed and diaphragm aperture controls only at the electronic strobe itself so that with either of these types of cameras the operator must remember to set the diaphragm at a proper setting for use with the particular electronic strobe.

SUMMARY OF THE INVENTION

It is a primary object of the present invention to provide for an electronic strobe a control circuitry which will enable the operator to eliminate the setting of controls at the electronic strobe and instead utilize only settings at the camera itself when the camera is of the type which has its own adjustable circuitry for automatically determining the extent to which film in the camera is exposed. Thus if the operator uses the electronic strobe of the invention with such a camera, then the operator need only make settings at the camera itself in order to adjust the operation of the electronic strobe to take into consideration a variable factor such as diaphragm setting and/or film speed.

However, it is also an object of the present invention to provide an electronic strobe which is capable of being used with a camera which does not have electronic shutter-control circuitry so that when used with such a camera the electronic strobe of the invention can still be adjusted as required to take into consideration such factors as film speed and diaphragm aperture.

It is furthermore an object of the present invention to provide a structure according to which a camera-controlled condition for the automatic electronic strobe or a strobe-controlled condition for the automatic electronic strobe can be achieved depending upon the manner in which a conductor assembly and connectors at the ends thereof are utilized for connecting the strobe to the camera.

It is in particular an object of the present invention to provide for this latter type of construction a single conductor assembly having at its opposed ends a pair of connected portions which are interchangeably receivable in a pair of receiving means of the electronic strobe and camera with a camera-controlled condition being provided when the pair of connecting portions are respectively connected in one way with the pair of receiving means while a strobe-controlled condition is provided when the connecting portions are reversed with respect to the pair of receiving means.

Furthermore, it is an object of the present invention to provide for the electronic strobe of the invention a pair fo conductor assemblies each having identical connecting portions at its end with the connecting portions of one of these assemblies being different from the connecting portions of the other of these assemblies and with all of these connecting portions being capable of cooperating with the pair of receiving means of the strobe and camera so that the operator can select one or the other of the conductor assemblies according to the connecting portions connected therewith for providing either a camera-controlled operating condition when the strobe is used with the camera which has its own electronic circuitry or for providing a strobe-controlled condition when the strobe is used with the camera which does not have its own electronic control circuitry.

Thus, according to the present invention an automatic electronic strobe capable of providing a variable amount of flash illumination is arranged in such a way that a preset diaphragm aperture provided at a camera which has an electronic shutter control circuit may be varied in order to bring about automatic adjustment of the amount of light emitted by the electronic strobe, in accordance with the setting of the diaphragm of the camera when the latter has the electronic shutter controls. Also, with the present invention, it is not only possible to control the light emitted by the automatic strobe according to a preset diaphragm of the camera which has electronic shutter-controlling circuitry, but also it is possible to utilize the automatic electronic strobe of the invention with a camera which does not have its own electronic circuitry with the automatic strobe of the invention itself being adjusted in this event so as to introduce a variable factor such as setting of the diaphragm.

With the pressent invention there is a photographic apparatus which includes an electronic strobe means for providing flash illumination, this electronic strobe means including a photosensitive means and circuitry electrically connected therewith for automatically determining the extent of flash illumination provided by the electronic strobe means. This circuitry of the electronic strobe means includes an adjustable electrical means for introducing into the latter circuitry at least one of a plurality of exposuredetermining variable factors such as film speed and diaphragm aperture. This latter circuitry also includes a switch means operatively connected with the adjustable means for electrically connecting the latter to the remainder of the circuitry or for disconnecting this adjustable means for the latter strobe circuitry. An elongated conductor means is provided for connecting the circuitry of the electronic strobe means to a camera for timing the operation of the electronic strobe means to provide flash illumination in synchronization with opening of the shutter of a camera. A connecting means is operatively connected with the conductor means for connecting the latter with the circuitry of the electronic strobe means in a selected one of a pair of conditions, namely a strobe-controlled condition and a camera-controlled condition. The switch means connects the adjustable means of the circuitry of the strobe means when the connecting means is in its strobe-controlled condition while the switch means disconnects the adjustable means from the circuitry of the strobe means when the connecting means is in its camera-controlled condition.

BRIEF DESCRIPTION OF DRAWINGS

The invention is illustrated by way of example in the accompanying drawings which form part of this application and in which:

FIG. 3 is a diagrammatic fragmentary illustration of an electronic strobe means showing control structures of the latter as well as a receiving means for receiving electrical connecting structure;

FIG. 4 is a schematic fragmentary sectional elevation taken along line IV—IV of FIG. 3 in the direction of the arrows and showing the receiving means of FIG. 3 as well as part of the electrical structure as shown also in FIG. 2;

FIG. 5 is a schematic front elevation of a camera having a receiving means adapted to be connected with a connector structure;

FIG. 6 is a fragmentary schematic sectional elevation of the receiving means of FIG. 5 taken along line VI—VI of FIG. 5 in the direction of the arrows;

FIG. 7 is a schematic fragmentary illustration of a conductor assembly and connecting means connected therewith for interconnecting a camera and strobe means according to the present invention;

FIG. 8 is a schematic fragmentary elevation of another embodiment of a strobe means of the invention;

FIG. 9 is a fragmentary schematic sectional elevation taken along IX—IX of FIG. 8 in the direction of the arrows and showing details of the receiving means of FIG. 8 as well as part of the circuitry of FIG. 2:

FIG. 10 is a fragmentary partly broken away schematic illustration of one type of assembly to be used with the camera of FIG. 5 and the electronic strobe of FIG. 8; and FIG. 11 is a schematic partly broken away elevation of another embodiment of a conductor assembly and a pair of connectors connected therewith for interconnecting the camera of FIG. 5 with the electronic strobe of FIGS. 8 and 9.

DESCRIPTION OF PREFERRED EMBODIMENTS

In order to conveniently describe the structure of the invention the description below refers initially to the circuitry of a camera which has electronic shutter-controlling circuitry, then to circuitry of the electronic strobe, then to structures for interconnecting the strobe with the camera, and finally a description of the operation of the structure of the invention is included.

ELECTRONIC SHUTTER CIRCUITRY INCORPORATED IN A CAMERA

Figure 1:
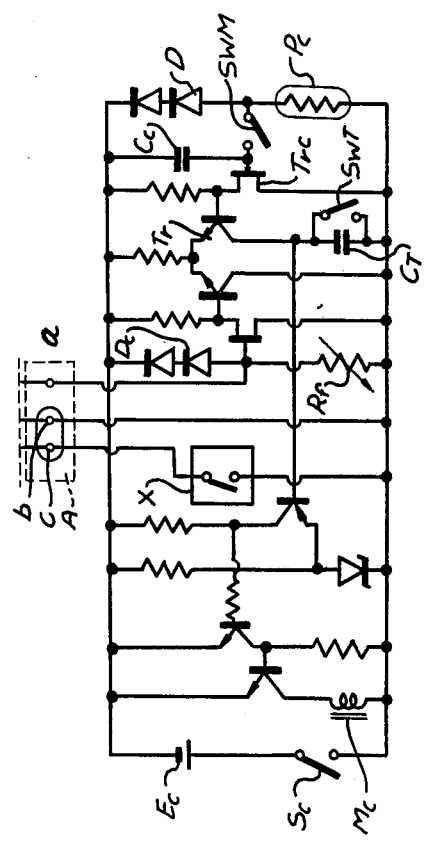
FIG. 1 is a wiring diagram of circuitry of a camera capable of automatically determining exposure of film therein, the circuitry of FIG. 1 showing a portion of this circuitry which is connected according to the invention to an electronic strobe.

Referring to FIF. 1, there is illustrated therein by way of example an electronic shutter-controlling circuitry wherein the source of energy is formed by the illustrated battery $E_c$. The circuit includes a main switch $S_c$ closed in a known way during the initial part of downward movement of a shutter-tripping plunger in order to energize the circuitry illustrated in FIG. 1. The illustrated circuitry also includes a photosensitive means $P_c$ and a diode D connected in series therewith, with these components also being connected in series with the source $E_c$ and the main switch $S_c$. The circuitry further includes a memory capacitor $C_c$ connected through a memory switch $S_wM$ in parallel with the diode D, so that the terminal voltage of the memory capacitor $C_c$ can be detected by the transistor $Tr_c$. In this way a photoelectric current flowing through the photoconductor which forms a photosensitive means $P_c$ generates a compressed voltage according to the light intensity of an object which is to be photographed, this voltage being applied across the terminals of the diode D and the memory capacitor $C_c$ is thus charged to a level corresponding to the terminal voltage of the diode D. As a result the transistor $Tr_c$ has applied thereto a memory voltage of high impedance from the memory capacitor $C_c$ and in turn applies this voltage to the base of a transistor Tr which forms part of a differential circuit. A timing capacitor $C_T$ is connected to the transistor $T_r$ in the differential circuit so that the voltage of the memory capacitor $C_c$ is applied through the transistor $Tr_c$ to the base of the transistor Tr for expansion, thus causing an expanded current flow through the latter transistor, and it is this expanded current which charges the timing capacitor $C_T$. An electromagent $M_c$ serves to release the trailing curtain of the shutter in order to bring about closing of the shutter when the electromagnet $M_c$ is acitivated in response to a switching circuit which is illustrated in FIG. 1 and which responds to the charging voltage of the timing capacitor $C_T$. This latter circuitry described above and shown in FIG. 1 has no difference from conventional circuitry of this type as presently utilized in single-lens reflex cameras which are well known. The circuitry includes a switch $S_wT$ which is a timing switch connected across the capacitor $C_T$ to reset the latter, this timing switch opening in synchronism with the opening of the shutter in a well known manner.

For the purpose of the present invention the above-described circuitry of FIG. 1 has no special requirements departing from conventional circuitry of this type and thus there is no further description of the circuitry of FIG. 1. However, referring to FIG. 1 it will be seen that there is illustrated therein a variable resistor $R_f$ which forms an adjustable electrical means of this camera circuitry of FIG. 1, this adjustable electrical means $R_f$ being adjustable for the purpose of introducing into the circuitry a resistance value corresponding to the setting of the diaphragm which is preset at the camera according to a desired aperture by turning the diaphragm-setting ring of the camera. Thus, the adjustable means $R_f$ is utilized in the illustrated circuitry for the purpose of introducing a variable exposure-determining factor such as diaphragm aperture, film speed, or both. This adjustable means $R_f$ forms part of a series circuit which is connected between the terminals of the battery $E_c$ and which includes the diode $D_c$. A junction of this series circuit which is situated between the diode $D_c$ and the variable resistor $R_f$ is electrically connected to a terminal a of a receiving means A of the camera, this receiving means A also being illustrated in FIG. 5 and forming a receiving means for receiving a connector of an electrical conductor assembly as described below. At the receiving means A of the camera there are also a pair of terminals b and c for the purpose of connection of the circuitry of FIG. 1 with a strobe which provides flash illumination, and it will be noted that the terminal c is connected with the switch X which in a well known manner closes in synchronism with opening of the shutter so as to energize the electronic strobe to provide flash illumination in proper timed relation with the opening of the camera shutter. The terminal b and c are insulated from each other but are arranged in a coaxial relationship, as is particularly apparent from FIG. 6. The pair of terminals b and c together with terminals FP (focal plane) for flash bulb actuation are arranged in a well known manner at a portion of the camera so as to be accessible at the exterior thereof as is apparent from FIGS. 5 and 6. The terminal b and c for the flash-synchronizing switch X are arranged at the exterior of the camera body so as to be connected with a plug commonly known as a DIN plug. It will be seen that the terminals b and c are illustrated in FIG. 1 as enclosed by an oval line while they are illustrated in FIG. 5 as being arranged in the usual manner near the terminals FP. The socket A and the terminals FP are shown in more detail in the sectional illustration of FIG. 6. According to the present invention the terminal a which is electrically connected with the variable resistor $R_f$ is situated near the pair of terminals b and c provided for the switch X, this variable resistor $R_f$ of course being an adjustable electrical means capable of having its resistance value adjusted in accordance with the selected diaphragm setting, for example, as set forth above.

ELECTRONIC STROBE

Figure 2:
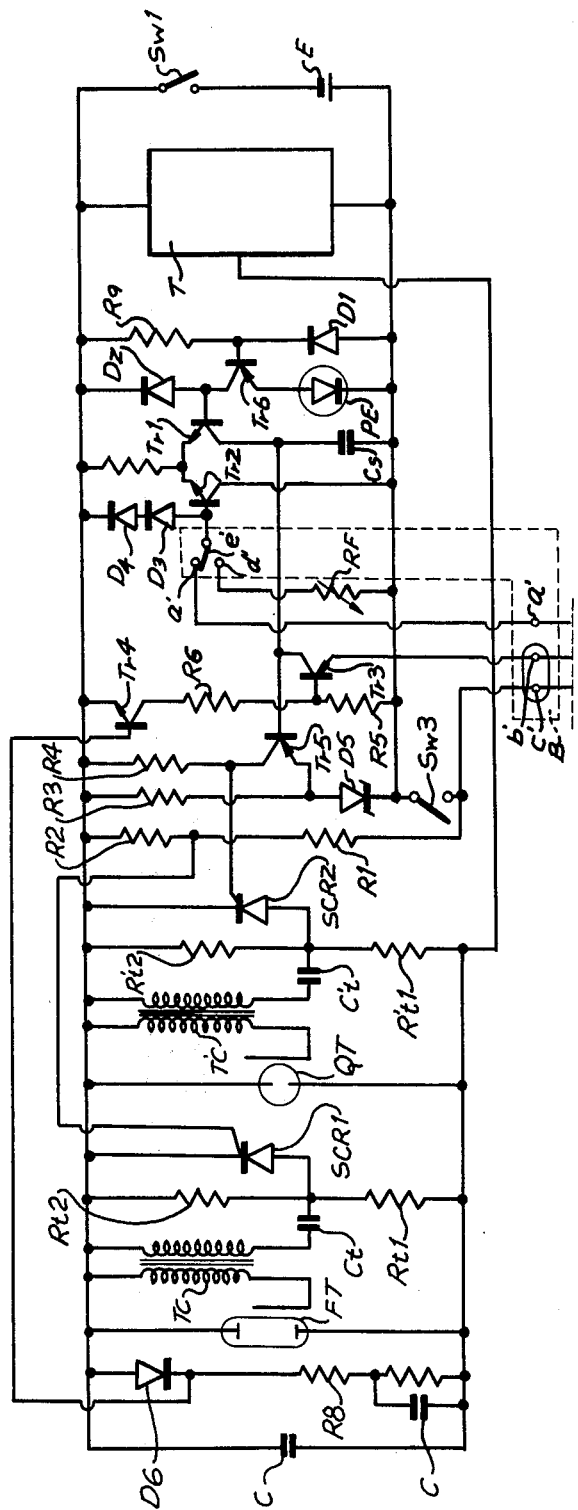
FIG. 2 illustrates the circuitry of an electronic strobe with this circuitry also including the portion thereof connected to the circuitry of a camera.

Referring now to FIG. 2, there is illustrated therein for the most part typical circuitry of an automatic electronic strobe. In the circuitry of FIG. 2 it will be seen that the energy source battery E provides the energy to be utilized for charging of the capacitor C utilized for light emission, this charging of capacitor C being brought about for the battery E in a known manner by way of a suitable booster T, the entire circuit being energized upon closing of the main switch $S_{wl}$. The series-connected resistors $R_1$ and $R_2$ are in a circuit connected to the terminal c' and form a voltage divider serving to divide a source voltage so that a gate of $SCR_1$ has applied thereto the terminal voltage of the resistor $R_2$ so that in this way $SCR_1$ is transferred to its conductive state, activating a trigger circuit which includes the resistor $R_{tl}$, a trigger capacitor $C_t$ and a trigger coil $T_c$, this trigger circuit serving to start the discharge of xenon discharge tube FT in a manner which is well known in the art. The circuitry of the electronic strobe means shown in FIG. 2 includes a photosensitive means PE in the form of a photoconductive element which is exposed to the light reflected from the object which is to be photographed, this light being reflected in response to transmission of light to this object from the discharge tube FT. This reflected light is detected by a photometric circuit which includes the photosensitive means PE, a diode $D_1$, a transistor $Tr_6$ and a resistor $R_9$. A diode $D_2$ serves to compress the photoconductive output current generated in this detection circuit so that the voltage thus compressed is applied to the base of a transistor $Tr_1$ to operate the latter and thereby a correspondingly expanded current flows through the collector of the transistor $Tr_1$. The diodes $D_3$ and $D_4$ are connected through a switch means e' either with a terminal d' or with a terminal a' and it will be seen that the switch means e' is in turn connected to the base of a transistor $Tr_2$. The transistor $Tr_3$ is connected in parallel with a capacitor $C_s$ which serves to integrate the signal formed by light-detection at the circuit which includes the photosensitive means PE, so that in this way the terminal voltage of a resistor $R_5$ is applied to the base of transistor $Tr_3$. This transistor $R_5$ is included in a circuit which includes not only the resistor $R_5$ but also the resistor $R_6$ and the transistor $Tr_4$, the latter components being in series. The transistor $Tr_3$ assumes either its conductive or its non-conductive state in accordance with the variations of voltage applied to the base thereof, and this transistor $Tr_3$ when in its conductive state forms a short-circuit for the integration capacitor $C_s$.

At the right of FIG. 2 are illustrated the seriesconnected resistors $R_7$ and $R_8$ which are connected in series with the diode $D_6$ forming therewith a series circuit which includes the components $R_7$, $R_8$ and diode $D_6$, and this series circuit is connected in parallel with the light-emission capacitor C constituting together with a capacitor C' connected in parallel across the resistor $R_7$ a voltage checker for the light-emission capacitor C. This series circuit which includes the resistors $R_7$ and $R_8$ also serves to apply to the base of transistor $Tr_4$ a variable voltage provided by this series circuit and through this circuitry the transistor $Tr_4$ is transferred into its conductive state when the light-emission capacitor C is charged to a level higher than the series circuit formed by resistors $R_5$, $R_6$, and transistor $Tr_4$, thus transferring the transistor $Tr_3$ to its conductive state in order to short-circuit the integration capacitor $C_s$ while the transistor $Tr_3$ transfers to its non-conductive state in order to operate the integration capacitor when the light-emission capacitor C is discharged. Thus, these transistors $Tr_3$ and $Tr_4$, the resistors $R_5$, $R_6$, $R_7$ and $R_8$, capacitor C' and diode $D_6$ constitute a resetting circuit for the integration capacitor Cs similar to a circuit which is used and well known in automatic strobes of this type. A terminal voltage checker for the integration capacitor Cs is arranged in such a way that the negative pole thereof is connected to the base of transistor $Tr_5$ which is included in a circuit which also includes a Zener diode $D_5$, transistor $Tr_5$ and resistor $R_4$, and the resistor $R_3$ is connected in parallel to a series circuit formed by the transistor $Tr_5$ and the resistor $R_4$. The Zener diode $D_5$ forms together with the resistor $R_3$ a reference voltage source with the terminal voltage of the diode $D_5$ being applied to the emitter of the transistor $Tr_5$. Thus, a switch circuit consisting of the transistor $Tr_5$, the diode $D_5$ and the resistor $R_3$ and $R_4$ is transferred into its conductive state when the integration capacitor Cs is charged with the expanded current flow through the transistor $Tr_1$ to a predetermined level at its terminal voltage, and the terminal voltage of the resistor $R_4$ at this time is taken out as a signal which terminates light emission. This signal voltage is applied to the gate of $SCR_2$ which is connected in parallel with a resistor $R'_{t2}$ which is included in a bleeder circuit consisting of the resistors $R'_{t1}$ and $R'_{t2}$ in order to start a circuit which is made up of the resistor $R'_{t1}$, a trigger capacitor $C'_t$ and a trigger coil $T'_c$, so as to activate in this way a quenching tube QT. A switch $S_{w3}$ is a manually operable switch for bringing about light-emission, this switch being adapted when closed to insert the resistors $R_1$ and $R_2$ into the strobe circuitry, these resistors $R_1$, $R_2$ being electrically connected by way of structure referred to below to the flash-synchronizing switch X of the camera shutter. Thus in this way a potential divider is formed between the source terminals independently of closure of the contact X so as to be capable of starting the discharge in this way. The switch $S_{w3}$ is illustrated at the left of FIGS. 3 and 8 at the schematically illustrated strobes shown therein. It is to be noted that an automatic strobe haing the details of a circuitry described above and shown in FIG. 2 is not essential for use with the present invention. Other automatic strobe circuits can also be used.

However, with the automatic strobe which is to be used with the invention, there is a variable resistor RF which forms an adjustable electrical means capable of being connected to and disconnected from the circuitry of the electronic strobe means of FIG. 2 by way of the switch means $e'$. This variable resistor RF which forms the adjustable means capable of being optionally connected to or disconnected from the circuitry of FIG. 2 is connected to the terminal $d'$ as well as to the voltage source E. The adjustable means RF is provided for introducing into the circuitry a variable exposure-determining factor such as diaphragm aperture or film speed. Thus, for example, the variable resistor RF may be set in accordance with a preselected diaphragm aperture. It will be noted that the switch means $e'$ is capable of being displaced between the terminal $a'$ and the terminal $d'$. As may be seen from FIGS. 1 and 2, when the terminal $a$ at the receiving means A of the camera is electrically connected with the terminal $a'$ at the receiving means B of the electronic strobe means, then by placing the switch means $e'$ in engagement with the terminal $a'$ the adjustable means Rf of the camera is connected to the circuitry of the electronic strobe of FIG. 2 so that it is possible to introduce into this circuitry a variable such as a selected diaphragm setting by way of the adjustable means of the camera itself, thus achieving in this way a camera-controlled condition for the electronic strobe means of FIG. 2. It will be noted that at this time, which is the position of the part shown in FIG. 2, the adjustable means RF of the electronic strobe circuitry is disconnected from this circuitry. However, as will be apparent from the description which follows, when the electronic strobe means of FIG. 2 is used with a camera which does not have the electronic shutter-control circuitry of FIG. 1, then the switch means $e'$ engages the terminal $d'$ so that the adjustable means RF is now connected with the remaining electronic strobe circuitry to enable the latter to be adjusted according to a variable such as a selected diaphragm aperture and film aperture and film speed, so that in this way the adjustable means RF is available for use in the event that the camera itself does not have an adjustable means which can be connected to the circuitry of FIG. 2 to control the latter from the camera itself. Thus with such an arrangement where the switch means $e'$ is connected to the terminal $d'$, the introduction of a variable factor such as diaphragm setting and film speed is provided by way of the adjustable means RF of the strobe circuitry.

As is apparent from FIG. 4, the switch means $e'$ normally engages through its inherent springy characteristics the terminal $d'$, while the terminal $a'$ is provided by way of an axially movable pin 30 which engages the switch means $e'$ as shown in FIG. 4 and which is capable of being displaced to the left, as shown in FIG. 4, in a manner described below, in order to displace the switch means $e'$ away from its normal position engaging the terminal $d'$ and instead establishing a contact with the terminal $a'$. The terminals $b'$ and $c'$ which are designated in FIG. 2 are shown in their actual coaxial relationship in FIG. 4. Thus, these terminals $b'$ and $c'$ as well as the pin 30 are accessible at the receiving means B of the electronic strobe means. As is apparent from FIGS. 1 and 2, when the conductor and connecting means of the invention, referred to below, electrically interconnect the terminals $b$ and $c$ with the terminals $b'$ and $c'$ of the electronic strobe, the switch X is connected into the circuit which includes resistors $R_1$ and $R_2$, this circuit being closed when the switch X closes in synchronism with opening of the shutter, so that the potential divider formed by the resistors $R_1$ and $R_2$ will operate in the manner described above the trigger the flash tube T in order to provide the flash illumination.

As may be seen from FIG. 4, the movable electrically conductive pin 30 is situated in a bore formed at the inner wall of the receiving means B of the electronic strobe means, this pin 30 carrying a flange which engages the inner surface of this wall and this flange is pressed against this inner surface by the springy force of the switch means $e'$, the latter switch engaging the terminal $d'$ when the flange of the pin 30 engages the wall of the receiving means B in the manner shown in FIG. 4. As is apparent from FIGS. 3 and 4, the pin 30 is situated below the coaxial contacts $b'$ and $c'$. Of course the pin 30 may be displaced to the left as viewed in FIG. 4, in opposition to the force of the springy switch means $e'$, so as to displace the switch means away from the terminal $d'$. Of course, when there is no element acting on the pin 30 to shift the latter to the left from the position shown in FIG. 4, the switch $e'$ remains in engagement with the terminal $d'$. It is to be noted that the wall of the receiving means B which is formed with the bore which receives the pin 30 is formed above the coaxial contacts $b'$ and $c'$ with an additional bore 20.

As may be seen from FIG. 7, there is illustrated therein an elongated conductor means 10 which includes the assembly of three conductors $a_o$, $b_o$, and $c_o$, and at one end the conductor means 10 is connected with a portion P of a connecting means P, Q, this end connecting portion P having an electrically conductive prong 20' connected to the conductor $a_o$ while at this connecting portion P the conductors $b_o$ and $c_o$ are arranged as illustrated for respective electrical connection with the terminals $b'$ and $c'$ illustrated in FIG. 4. In FIG. 7 there is shown for the connecting portion P of the connecting means a recess or bore 40 formed in the connecting portion P at the opposite side of the conductors $b_o$, $c_o$ from the prong 20'. The arrangement is such that when this connecting portion P is introduced into the receiving means B, the prong 20' will simply extend through the bore 20 without having any influence on the circuitry, while the conductors $b_o$ and $c_o$ will be electrically connected with the terminals $b'$ and $c'$, respectively, and the pin 30 will be received in the recess 40. The size and position of the recess 40 is such that the connecting portion P will remain spaced from and out of engagement with the pin 30 so that when the connecting portion P is introduced into the receiving means B of FIGS. 3 and 4, the switch means $e'$ will remain in engagement with the terminal $d'$. In this position the connecting means PQ together with the conductor means 10 provides a strobe-controlled condition for the circuitry of FIG. 2 in that in this position of the parts which is shown in FIG. 4 the adjustable means RF of the strobe circuitry is connected to the remainder of the strobe circuitry in order to introduce a factor such as diaphragm setting.

Referring to FIG. 3, the manner in which the adjustable means RF is adjusted is illustrated, according to one example. Thus it will be seen that the control head 11 of the electronic strobe means includes for setting of the variable resistor RF an outer dial ring 12 which carries a scale 14 of f-stop numbers corresponding to the exposure aperture sizes, as is well known, this ring also carrying a film-sensitivity or film speed scale 17, this outer dial ring 12 cooperating with a stationary index 18 while surrounding a knob 16 carrying an index 15, and all of these components form an adjustable means 13 for adjusting the variable resistor RF. The arrangement is such that when the outer ring 12 is turned to set a selected film-speed value in alignment with the index 18 the knob 16 can be turned to place the index 15 in alignment with a selected graduation of the aperture scale 14, and both of these components 12 and 16 serve in a known way to adjust the variable resistor RF so that the setting of the later corresponds to the combination of the exposure-determining variables of film speed and aperture setting.

CONDUCTOR ASSEMBLY AND CONNECTING MEANS

The conductor means 10 and the connecting portion P of the connecting means P, Q of FIG. 7 have already been referred to above. Of course the several conductors $a_o$, $b_o$, and $c_o$ are insulated from each other. At the connecting portion Q of the connecting means it will be seen that the conductors $b_o$ and $c_o$ are arranged in the same way as at the connecting portion P in order to cooperate in the same way with the terminals $b'$ and $c'$ shown in FIG. 4. However, the connecting portion Q of the connecting means of FIG. 7 has electricallly connected with the conductor $a_o$ a tubular electrically conductive terminal 30' for receiving the pin 30, this tubular conductor 30' being shorter than the part of the pin 30 which projects to the right beyond the inner wall of the receiving means B, as viewed in FIG. 4, so that when the connecting portion Q is received in the receiving means B, the pin 30 is displaced to the left, as viewed in FIG. 4, disconnecting the switch means $e'$ from the terminal $d'$ and instead providing an electrical connection with the conductor $a_o$ through the pin 30 and the tubular element 30' so that in this way an electrical circuit is now completed through the terminal $a'$. In this position of the parts a camera-controlled condition for the strobe circuitry is provided in that when the terminal $a'$ is connected into the circuit by way of the switch means $e'$ it is the adjustable means $R_f$ of the camera which is connected to the strobe circuitry while the adjustable means RF is disconnected therefrom as described above.

It is to be noted that the connecting portions P and Q of the connecting means P, Q of FIG. 7 are interchangeably receivable in the pair of receiving means A and B of the camera of FIG. 5 and the strobe means of FIG. 3, respectively. The coaxial terminals $b$ and $c$ of the camera at the receiving means A thereof are illustrated in FIG. 6, and these terminals can receive the ends of the conductors $b_o$ and $c_o$ at either one of the connecting portions P and Q. The terminal $a$ of the receiving means A is tubular and capable of receiving the electrically conductive pin 20' of the connecting portion P when the latter is received at the receiving means A.

It is therefore apparent that with this structure of the invention when a camera having the circuitry of FIG. 1 is used with the strobe means of the invention, the connecting portion P of the connecting means P, Q will be placed in the receiving means A of the camera while the conecting portion Q will be placed in the receiving means B of the electronic strobe, and in this way a camera-controlled condition will be provided inasmuch as the adjustable means RF will be disconnected from the remainder of the strobe circuitry and instead the adjustable means $R_f$ of the camera circuitry will be electrically connected to the strobe means, with the switch means $e'$ having the position indicated in FIG. 2 at this time. However, when the strobe means is to be used with a camera which does not have the electronic shutter-controlling circuitry of FIG. 1, then the connecting portion Q is placed in the receiving means A, while the connecting portion P is placed in the receiving means B of the electronic strobe, and thus at this time the parts will have the position indicated in FIG. 4 where the switch means $e'$ engages the terminal $d'$, and in this position of the parts the pin 20' simply extends through the opening 20 wihtout having any influence on the circuitry and it is only the conductors $b_o$ and $c_o$ which serve at this time to interconnect the terminals $b$ and $c$ of the camera respectively with the terminals $b'$ and $c'$ of the electronic strobe, so that in this position of the parts a strobe-controlled condition is provided with the variable factors such as film speed and diaphragm setting being introduced by way of the adjustable means RF adjusted in the manner described above in connection with FIG. 3.

It is therefore possible with the structure of the invention to enable photographs to be made with the amount of flash illumination being automatically controlled in accordance with a preset diaphragm aperture at the camera when used with the strobe of the invention a camera having the circuitry of the type shown in FIG. 1 and with the connecting portion P of FIGS. 7 being placed in the receiving means A while the connecting portion Q is placed at this time in the receiving means B. On the other hand, when the electronic strobe means of the invention is used with a camera which does not have the automatic electronic shutter-controlling circuitry of the type shown in FIG. 1, the connecting portion P will be placed at the receiving means B of the electronic strobe means while the connecting portion Q will be placed at the receiving means A, and at this time there will be no electrical connection through the conductor $a_o$, so that the adjustment will be made for a factor such as film speed and diaphragm setting by way of the variable resistor RF of the strobe circuitry. Of course, under these conditions the diaphragm setting at the camera will be selected by the operator to match the diaphragm setting provided by way of the variable resistor RF.

CAMERA-CONTROLLED STROBE OPERATION

As has been indicated above, when the connecting portion P of the connecting means of FIG. 7 is received in the receiving means A of the camera while the connecting portion Q is received in the receiving means B of the electronic strobe means, then the variable resistor $R_f$ of FIG. 1 is electrically connected with the strobe circuitry of FIG. 2 while the various resistor RF of this strobe circuitry is disconnected therefrom. In this position of the parts the tubular conductor 30' which receives the pin 30 displaces the latter to the left from the position shown in FIG. 4 so as to displace the switch means $e'$ away from the terminal $d'$ thus establishing a connection through the terminal $a'$ and the terminal $a$ at the camera. Of course, the conductors $b_o$ and $c_o$ serve to interconnect the terminals $b'$ and $c'$ of the receiving means B of the electronic strobe means with the terminals $b$ and $c$ of the receiving means A of the camera. Thus, in this camera-controlled condition of the electronic strobe means of FIG. 2, the variable resistor $R_f$ of the camera, which is set by the diaphragm-setting structure of the camera, is electrically connected with the strobe circuitry of FIG. 2.

Of course, the shutter of the camera is set according to an exposure time required for flash photography such as an exposure time of 1/60 second. The main switch $S_c$ of the circuitry of FIG. 1 remains open so that the electronic shutter-control circuitry does not operate when exposure is made with flash illumination. Under these conditions, the polarity of the transistors of the electronic shutter circuitry has an inverse relationship with respect to the power source of the electronic strobe, and as a result the shutter will not operate as an electronically-controlled shutter. Upon closing the main switch $S_{w1}$, the booster circuit T of the strobe circuitry is activated by the battery E which serves as a voltage source in order to charge the capacitor C for the light emission up to a predetermined voltage, and thus the camera and strobe are in readiness to make an exposure. When the shutter is tripped so as to open in order to make an exposure, the switch X to bring about the flash illumination in synchronism with the shutter opening is closed, and thus the voltage divider made up of the resistor $R_1$ and $R_2$ has the source voltage applied thereto with the result that the terminal voltage of resistor $R_2$ is applied to the gate of $SCR_1$ to transfer the latter into its conductive state. As a result, the trigger circuit made up of resistor $R_{t1}$, capacitor $C_t$ and trigger coil $T_c$ excites the xenon discharge tube FT in order to commence discharge and flash illumination. The light emitted from the xenon discharge tube FT illuminates the object which is to be photographed and the light reflected from the object is received by the photoconductive element PE. Thus, the amount of light is detected by the photometric circuit which includes the photosensitive means PE, the diode $D_1$, the transistor $Tr_6$ and the resistor $R_9$. A photoelectric output current of this photometric circuit is compressed by the diode $D_2$ and the voltage thus compressed is applied to the base of transistor $Tr_1$ with the latter being operated by applying a corresponding expanded current to the collector thereof. The resistance value of the variable resistor $R_f$ is, on the other hand, determined by the selected diaphragm setting which the operator has provided at the camera, so that the information with respect to the diaphragm aperture is converted by the variable resistor $R_f$ and the diodes $D_3$ and $D_4$ into a logarithmically compressed voltage which is, in turn, applied to the base of transistor $Tr_2$ so as to control the expanded current flowing through the transistor $Tr_1$ serving as a differential amplifier in accordance with the selected diaphragm aperture. When the terminal voltage of the integration capacitor $C_s$ which has been charged with this expanded current reaches a predetermined level, the transistor $Tr_5$ included in the switching circuit which in addition to transfer $Tr_5$ includes the diode $D_5$ and the resistors $R_3$ and $R_4$ is turned into its conductive state and thus a voltage is generated at the resistor $R_4$. This voltage serves as a signal in order to terminate emission of light by the electronic strobe, the latter voltage being applied to the gate of $SCR_2$ which thus is rendered conductive and activates the trigger circuit which includes the resistor $R'_{t1}$, the trigger capacitor $C'_t$, and the trigger coil $T'_c$ which thus excites the quenching tube QT. Now the electrical current for emission of light which otherwise would flow through the xenon discharge tube FT is diverted into the quenching tube QT and as a result the xenon discharge tube FT ceases to emit light.

In the above series of operation the time point at which light emission by xenon discharge tube FT is terminated is determined in accordance with the intensity of light reflected from the object to be photographed as well as in accordance with the setting of the variable resistor $R_f$, or in other words in accordance with the diaphragm setting at the camera. Thus, the circuit connecting the transistor $Tr_3$, the transistor $Tr_4$ and the resistors $R_5$ and $R_6$ together with the circuit made up of the resistors $R_7$ and $R_8$, the diode $D_6$ and the capacitor $C'$, this latter circuit leading to the base of transistor $Tr_4$, constitutes the reset circuit for the integration capacitor $C_s$. Although the integration capacitor $C_s$ is in a short-circuited condition upon completion of preparation for light emission inasmuch as the transistor $Tr_3$ is in a conductive state at this time, a voltage drop appears at the light-emission capacitor C when the xenon discharge tube starts to emit light, and as a result the transistor $Tr_4$ is transferred from its conductive into its non-conductive state, thus resulting in transferring the transistor $Tr_3$ into its non-conductive state, so as to enable the integration capacitor $C_s$ to carry out the required integration. This integration serves to control the duration starting from light-emission by the xenon discharge tube FT and ending with bypass of the discharge by way of the quench tube QT inasmuch as integration brings about a variation in the base voltage and accordingly the expanded current of the transistor $Tr_2$ determined by the resistance value of the variable resistor $R_f$ so as to control the duration of light emission before a predetermined value is reached by the terminal voltage of the capacitor $C_s$. As a result, the amount of light emitted by the xenon discharge tube FT is automatically controlled within a range providing an acceptable light amount in accordance with the intensity of the light reflected from the object to be photographed and in accordance with a variable factor such as the diaphragm setting provided at the camera.

STROBE-CONTROLLED OPERATION OF THE ELECTRONIC STROBE MEANS

When, in contrast with the above operation, a camera is used which does not have the automatic shutter-controlling circuitry provided with a variable resistor such as the resistor $R_f$, then the connecting portions P and Q of the connecting means P, Q are reversed so that now the connecting portion P is received by the receiving means B of the electronic strobe means while the connecting portion Q is received by the receiving means A of the camera. It will be noted that now the terminals $b$ and $c$ of the camera are still electrically connected with the terminals $b'$ and $c'$ of the electronic strobe means. However, the terminal $a$ of the camera is maintained in the condition where it is disconnected from the terminal $a'$ of the electronic strobe means. Thus, at this time the prong 20' of the connector portion P simply extends through the opening 20 of FIG. 4 while there is no component of the connector portion Q which is in electrical connection with the terminal $a$ of the receiving means A of the camera, so that in this condition both the terminal $a$ of FIG. 1 and the terminal $a'$ of FIG. 2 are in an open condition. The pin 30 is received in the recess 40 of the connector portion P without engaging the latter. Therefore the switch means $e'$ remains in engagement with the terminal $d'$, and thus the strobe-controlled condition is provided where the adjustable means RF is connected to the remainder of the strobe circuitry. Thus, at this time the adjusting means 13 shown in FIG. 3 and described above may be adjusted to select a diaphragm graduation corresponding to the diaphragm setting at the camera as well as to select a film speed corresponding to the film which is in the camera to be exposed therein, and in this way the variable resistor RF is adjusted so that now the roll previously played by the resistor $R_f$ is carried out by the resistor RF, and thus the xenon discharge tube FT will achieve the required light-emission with an acceptable amount of light according to the preset diaphragm value in the same way as desired above in connection with a camera having the circuitry of FIG. 1.

It is to be noted that the connector portion Q may be connected in its entirety to the socket provided in conventional cameras for the contact X inasmuch as this connecting portion Q has only the single projection at the end of the conductors $b_o$ and $c_o$ which corresponds to the conventional DIN plug.

Instead of an arrangement as shown in FIGS. 3-7 where a single conductor means 10 and a pair of connector portions P and Q are utilized interchangeably with the pair of receiving means A and B as described above in order to achieve camera-controlled and strobe-controlled operation of the electronic strobe means, it is possible to utilize an arrangement as shown in FIGS. 8-11 where the receiving means B of the electronic strobe is modified with respect to the receiving means B illustrated in FIGS. 3 and 4 and instead the conductor means includes a pair of conductor assemblies 10 respectively illustrated in FIGS. 10 and 11 each of these assemblies having at its opposed ends identical connector portions P, with one pair of identical connector portions P being different from the other pair of connector portions P, as is apparent from a comparison of FIGS. 10 and 11. Thus, with this embodiment the operator need not distinguish between the opposed connector portions at the opposite ends of a single conductor means and instead the operator will select one or the other of the assemblies of FIGS. 10 and 11 in order to achieve either a camera-controlled or a strobe-controlled operation of the electronic strobe means. As is apparent from FIG. 11, the conductor means 10 illustrated therein only has a pair of conductors $b_o$ and $c_o$ for interconnecting the terminals $b$ and $c$ of the camera with the terminals $b'$ and $c'$ of the electronic strobe means. Thus, one of the connecting portions P of FIG. 11 will be received in the receiving means A of the camera of FIGS. 5 and 6 to provide an operation identical with that provided when the connecting portion Q of FIG. 7 is received in the receiving means A of the camera. At this time the other connecting portion P of FIG. 11 will be connected with the receiving means B which is illustrated in FIGS. 8 and 9. It will be seen that this receiving means has only an opening 20 in addition to the pair of coaxial terminals $b'$ and $c'$, so that when the assembly of FIG. 11 is used only the terminals $b$ and $c$ of the camera are connected with the terminals $b'$ and $c'$ of the electronic strobe, so that at this time a strobe-connected condition is provided as set forth above.

On the other hand, when the assembly of FIG. 10 is used, the terminals $b$ and $c$ of the camera will be connected in the same way with the terminals $b'$ and $c'$ of the electronic strobe. However, it will be seen that the structure of FIG. 10 includes the conductor $a_o$ extending between the pair of prongs 20' situated at the pair of identical connector portions P of FIG. 10. One of these prongs 20' will be received at the terminal $a$ of the receiving means A of the camera while the other of the prongs 20' will extend through the opening 20 in order to engage the switch meanns $e'$ to displace the latter away from the terminal $d'$, thus establishing a connection through the terminal $a'$ illustrated in FIG. 2 and disconnecting the variable resistor RF of the strobe circuitry from the remainder of the strobe circuitry while in this case connecting the variable resistor $R_f$ of the camera into the circuitry in the manner described above. Thus the assembly of FIG. 10 will be used in this case in order to provide a camera-controlled condition for the electronic strobe means. Therefore, with the embodiment of FIGS. 8-11 the operator need only have one assembly as shown in FIG. 10 when the electronic strobe means is used with a camera having circuitry of the type shown in FIG. 1 while with a camera which does not have such circuitry the operator can use the assembly of FIG. 11. Thus the structure of the invention provides an extremely wide range of utility.

It is thus apparent from the above description that in accordance with the present invention a proper light-emission by way of an electronic strobe means will be provided in accordance with a selected diaphragm aperture as selected by the operator by connecting the automatic electronic strobe means to the camera. When the camera has an electronic shutter-controlling circuitry, then the control of the electronic strobe means will include the adjustments at the camera itself in connection with factors such as film speed and diaphragm aperture, without requiring adjustment at the strobe means itself and a proper automatic determination of light-emission will be achieved with the particular settings provided at the camera itself. On the other hand, with a conventional camera which does not have the electronic shutter-controlling circuitry of the type shown in FIG. 1, it is also possible to use the electronic strobe of the invention, with the latter at this time being controlled by the variable resistor RF in the manner described above. With the embodiment of FIGS. 3–7 it is necessary only to interchange the connecting portions P and Q with the receiving means A and B, while with the embodiment of FIGS. 8–11 it is only necessary to select one or the other of the assembly shown in FIGS. 10 and 11.

What is claimed is:

1. In a photographic apparatus, electronic strobe means for providing flash illumination, said electronic strobe means including a photosensitive means and circuitry electrically connected therewith for automatically determining the extent of flash illumination provided by said electronic strobe means, and said circuitry including adjustable electrical means for introducing into said circuitry at least one of a plurality of exposure-determining variable factors such as film speed and diaphragm aperture, and said circuitry also including a switch means operatively connected with said adjustable means for electrically connecting the latter to the remainder of said circuitry or for disconnecting said adjustable means from said circuitry, elongated conductor means for connecting said circuitry of said electronic strobe means to a camera for timing the operation of said electronic strobe means to provide flash illumination in synchronism with opening of a shutter of the camera, and connecting means operatively connected with said conductor means for connecting the latter with said circuitry of said electronic strobe means in a selected one of a pair of conditions, namely a strobe-controlled condition and a camera-controlled condition, said switch means connecting said adjustable means to said circuitry when said connecting means is in said strobe-controlled condition and said switch means disconnecting said asjustable means from said circuitry when said connecting means is in said camera-controlled condition.

2. The combination of claim 1 and including a camera, and said connecting means cooperating with said switch means for providing connection or disconnection of said adjustable means to or from said circuitry depending upon whether the camera used with the electronic strobe means has its own circuitry including adjustable means for introducing a variable exposure-determining factor such as film speed and diaphragm aperture, said connecting means providing also for connection of said adjustable means of said camera, in the event the camera has such adjustable means, to the circuitry of said strobe means while disconnecting said adjustable means of said circuitry of said strobe means and also providing for the possibility of connecting said adjustable means of said strobe means to the circuitry thereof in the event that the camera used with said strobe means does not have its own adjustable means.

3. The combination of claim 2 and wherein said camera and said strobe means each have a receiving means and wherein said connecting means has a pair of opposed end portions while said connecting means has a pair of opposed connecting portions respectively connected with said opposed end portions of said conductor means and respectively receivable in said pair of receiving means for connecting said strobe means to said camera means in one or the other of said conditions.

4. The combination of claim 3 and wherein the opposed connecting portions of said connecting means are interchangeably receivable in said pair of receiving means.

5. The combination of claim 4 and wherein said conductor means includes only a single elongated conductor assembly while said connecting means includes only a pair of opposed connecting portions one of which provides one of said conditions when connected with said receiving means of said strobe means and the other of which provides the other of said conditions when connected with said receiving means of said strobe means.

6. The combination of claim 3 and wherein said conductor means includes a pair of conductor assemblies each having at said end portions of a pair of identical connecting portions of said connecting means, said one of the pair of connecting portions connected with one of said conductor assemblies providing one of said conditions when said pair of opposed connecting portions thereof are received in said pair of receiving means while the other of said conductor assemblies provides at said opposed connecting portions connected thereto the other of said conditions when the latter pair of identical connecting portions are respectively received in said receiving means.

7. The combination of claim 2 and wherein said switch means normally has a position connecting said adjustable means of said circuitry of said strobe means to the remainder of the circuitry thereof, and said connecting means when providing said camera-controlled condition acting on said switch means to displace the latter away from said normal position connecting said adjustable means of said circuitry of said strobe means to the remainder of the circuitry thereof and into a position disconnecting the latter adjustable means from said circuitry of said strobe means and instead connecting said adjustable means of the camera to said circuitry of said strobe means.

8. The combination of claim 7 and wherein said receiving means of said strobe means supports for movement a pin which is operatively connected with said switch means for controlling the latter, and one of said connecting portions when received in said receiving means being spaced sufficiently with respect to said pin to prevent displacement thereof while the other of said connecting portions when connected with said receiving means of said electronic strobe means acting on said pin to displace the latter and change the position of said switch means.

9. The combination of claim 8 and wherein one of said connecting portions is formed with a recess for receiving a portion of said pin without displacing the latter to provide one of said conditions while the other of said connecting portions has an electrically conductive terminal cooperating with said pin for displacing the latter to change the position of said switch means while also providing an electrical connection through said pin and displaced switch means so that in the latter condition said camera-controlled condition can be provided while in the former condition where said pin is not disturbed by said connecting means said strobe-controlled condition can be provided.

10. The combination of claim 6 and wherein each of one of said pair of opposed identical connecting portions includes a switch-operating element for changing the position of said switch means so that one of the latter connecting portions which is received in said receiving means of said strobe means while the other pair of connecting portions remain spaced from and out of engagement with said switch means so as not to disturb the latter while providing a connection between the camera and said strobe means for synchronizing the flash illumination thereof with the opening of the shutter of the camera, whereby with the latter pair of connecting portions the strobe-controlled condition can be provided while with the former pair of connecting portions the camera-controlled condition can be provided.

* * * * *